United States Patent [19]
Karpoff et al.

[11] Patent Number: 5,730,891
[45] Date of Patent: Mar. 24, 1998

[54] UNDERCARRIAGE FOR WELDER

[75] Inventors: Mark C. Karpoff, Willowick; Steven J. Kelemen, University Heights, both of Ohio

[73] Assignee: The Lincoln Electric Company, Cleveland, Ohio

[21] Appl. No.: 633,127

[22] Filed: Apr. 16, 1996

[51] Int. Cl.$^6$ .............................. B23K 9/32; B62D 43/00
[52] U.S. Cl. ............................................ 219/136; 414/466
[58] Field of Search ........................... 219/136, 130.1; 414/466, 469, 470; 254/1, 2 R, 2 C, 3 R; 280/43.12

[56] References Cited

U.S. PATENT DOCUMENTS

| | | | |
|---|---|---|---|
| 3,108,179 | 10/1963 | Ulli | 219/137.9 |
| 3,237,051 | 2/1966 | Schober | 219/130.1 |
| 3,471,046 | 10/1969 | Hess | 414/469 |
| 3,682,342 | 8/1972 | Evans | 254/2 R |
| 3,720,336 | 3/1973 | Murray et al. | 414/470 |
| 4,021,070 | 5/1977 | Shea | 414/466 |
| 4,573,665 | 3/1986 | Strohl et al. | 219/383 |
| 4,738,582 | 4/1988 | Roberts | 414/469 |
| 5,440,098 | 8/1995 | Matus | 219/136 |

*Primary Examiner*—Clifford C. Shaw
*Attorney, Agent, or Firm*—Vickers, Daniels & Young

[57] ABSTRACT

A platform for use in loading and supporting a gas cylinder onto a movable welder undercarriage which platform comprises a lower cylinder support pate with a rear end, a front end and a normal level cylinder supporting position; means for mounting the platform on the rear of the undercarriage to pivot about a transverse axis in a first pivot direction to a cylinder loading position with the rear end of the support plate tilted downward against the floor and in a second pivot direction with the support plate in the cylinder support position, where the weight of said cylinder is one the side of the pivot axis toward the front end of the support plate; and, stop means for preventing rotation of the platform abut the pivot axis in the second direction beyond the normal position of the support plate of the platform.

43 Claims, 12 Drawing Sheets

UNDERCARRIAGE FOR WELDER

The present invention relates to the art of electric arc welding and more particularly to an undercarriage for supporting a welder and carrying a gas cylinder as it is moved between locations where the welder will be used.

BACKGROUND OF INVENTION

It is common practice in the arc welding industry to mount a welder, such as a TIG welder, onto an undercarriage having roller wheels and/or casters so that the welder can be transported with ease into different areas of the facility using the welder. The undercarriage includes a welder fixed onto a base member with an appropriate handle to move the welder and undercarriage manually between locations. In many instances, an arc welder is used with shielding gases; therefore, the undercarriage must be provided with an appropriate tray or support portion to carry a large cylinder of shielding gas. Gas cylinders or bottles are relatively long and weigh substantially over 150 pounds, with small diameters, generally in the neighborhood of 8–10 inches. These gas cylinders are extremely heavy, are awkward to move and are somewhat fragile in that they include high pressure, oxygen excluding, inert gases. The tops of the cylinders are provided with an appropriate valve which is protected during transient by a removable cup-shaped cover. Since the undercarriage and welder must be moved, the gas cylinder is, by necessity, supported on the base of the undercarriage in a position above the floor. Consequently, it is necessary to lift the heavy, awkward, long gas cylinder from the floor onto the rear end of the base portion of the undercarriage. This loading process requires lifting of the cylinder which presents substantial problems and requires a person of at least a given level of strength. Such person normally positions the cylinder on the floor behind the undercarriage. The gas cylinder is then bear hugged by the operator and lifted onto the back of the undercarriage. To prevent the cylinder from being inadvertently dislodged from the rear of the undercarriage, there is a rear ledge or lip over which the cylinder must be lifted. This type of cylinder loading activity must be performed often, especially when the welder mounted on the undercarriage is used in high production facilities. Consequently, there is a substantial need for a system to lift the heavy gas cylinder from the floor and place it in the proper position on the undercarriage for movement with the undercarriage and welder. No lifting arrangement has yet been developed which is inexpensive, easily manipulated and positive in operation.

INCORPORATION BY REFERENCE

U.S. Pat. No. 5,440,098 discloses a lifting arrangement for lifting gas cylinders onto the back of an undercarriage or running gear for an arc welding power supply. This patent is incorporated by reference herein as background information, even through this particular structure has not been widely used.

THE INVENTION

In accordance with the invention there is provided an undercarriage for a welding power supply, which facilitates loading and unloading of a heavy gas cylinder onto the rear portion of an undercarriage to be moved to transport a power supply from location-to-location in a facility using the arc welder. This undercarriage includes a base for supporting the power supply, wherein the base has a running gear and a rear portion for supporting a large gas cylinder containing pressurized inert shielding gas. In accordance with the invention, the undercarriage is provided with a platform for loading the gas cylinder from the floor onto the rear of the undercarriage. This platform has a rearwardly facing end and means on the base to pivotally mount the platform for movement between a first position tilted downwardly with the rear end of the platform against the floor to load the cylinder onto the flat surface of the platform and a second position tilted upwardly with the rear end of the platform raised from the floor to a position that supports the cylinder onto the rear end of the base of the undercarriage. By providing a pivoted platform on the rear of the undercarriage, the heavy gas cylinder is first tilted in the transverse direction with respect to the back of the undercarriage and then is rolled upwardly onto the downwardly tilted platform until the cylinder weight is on the in board side of a transversely extending pivot axis of the platform. At that time, the platform pivots upward from the floor and brings the cylinder automatically into the loaded position on the back of the undercarriage.

In accordance with an aspect of the invention, the normal level position with the gas cylinder supported on the base of the undercarriage is a position tilted forwardly approximately 3–10°. Thus, the cylinder is tilted toward the welder and the front of the undercarriage. In accordance with standard practice, the welder has an upper support plate forming a nest for engaging the upper portion of the gas cylinder, as it is tilted forward by the novel platform forming the present invention. In accordance with another aspect of the invention, the platform has a rearwardly facing bumper with a transversely extending, generally vertical wall and terminating in a lower lip which engages the floor as the platform is tilted to the cylinder loading position. The lip is bent at an angle with respect to the lower cylinder supporting surface of the platform, so that when the platform is in the down, cylinder loading position, the surface of the lip coincides with, and matches, the surface of the floor. In accordance with an aspect of the invention, the lower surface of the floor engaging lip is provided with friction coefficient increasing material, such as an adhered layer of friction cloth. In this manner, as the cylinder is moved onto the lowered platform, the friction surface of the lip is forced downwardly against the floor, thus preventing the undercarriage from moving away from the cylinder being rolled onto the rear end of the downwardly tilted platform. In accordance with an aspect of the invention, the platform itself is provided with a coefficient of friction increasing material also. In this manner, as the tilted heavy gas cylinder is rotated up the platform, the coefficient of friction between the cylinder and the surface of the platform is such that the rolling action by the operator of the gas cylinder allows the cylinder to climb up the inclined support surface of the downwardly tilted platform until the cylinder passes to the other side of the transverse pivot axis of the platform. At that time, the platform pivots upwardly into its normal position, which as previously mentioned, tilts forward a slight amount to press the cylinder against the upper support on the top of the welder. There is provided a stop means for preventing further rotation of the platform beyond the normal level position. This stop means includes an abutment member on the base, which abutment member, in practice, is the axle for the rear wheels of the undercarriage. There is a stop portion on the platform which, in practice, is a transversely extending hook portion formed at the front end of the platform, which hooks over the wheel axle of the undercarriage so that as the platform tilts into its normal support position the hook engages the top of the wheel axle and prevents further tilting of the platform.

By using the present invention, an operator merely brings the heavy gas cylinder to a position at the rear of the undercarriage. The weight of the welder maintains the undercarriage in a horizontal position. The operator tilts the gas cylinder transversely to the undercarriage and rotates it toward the rear of the undercarriage. When the heavy cylinder engages the platform, the platform is forced downwardly with a friction surface of the lower lip engaging the floor. There is a vertical wall defining a slight distance between the floor and the end of the flat surface onto which the cylinder will be rotated. However, the rotation of the cylinder over this vertical wall and onto the flat surface of the platform is accomplished with no difficulty. The height of this vertical wall above the lip is relatively small and does not form any impediment to the rotation of the cylinder onto the platform. This wall forms a forward bumper edge for the platform and is useful when the carriage is moved from place-to-place. This bumper is the rear most portion of the undercarriage after the cylinder is loaded. After the cylinder is rotated upwardly onto the platform, the cylinder moves into the final support position as previously described. Consequently, there is no need for lifting the cylinder. The elevation of the cylinder is accomplished by the rotating action performed by the operator. After the cylinder is in place, the rear of the platform extends slightly from the cylinder. This portion is the bumper that prevents damage by collision of the undercarriage with objects around the facility. After the cylinder is in place, it is secured by a unique chain arrangement which has two fixed vertically spaced support points and a third connecting point which is manually attached after wrapping the chain system around the cylinder as it is in the upper supported position. If weight is applied to the end of the platform when the cylinder is positioned onto the undercarriage with the proper chain restraints, the platform merely tilts downwardly without raising the undercarriage and welder. A semi-circular relief opening, or recess is provided below the forward portion of the surface of the platform engaged by the base of the cylinder. When the platform is tilted backwardly with the cylinder released from the chains, the cylinder extends into the recess or relief without being propelled in a rearward direction. With the chains removed, the platform can be pivoted downwardly while the cylinder is tilted for unloading of the cylinder. The cylinder will then remain in the flat upper surface of the platform and not extend into the recess or relief even though the center of gravity of the cylinder is over the recess opening. The recess allows the cylinder to tilt slightly if necessary.

The primary object of the present invention is the provision of an undercarriage for a welder, which undercarriage has a pivoted platform allowing easy loading and unloading of the inert gas cylinder onto the rear portion of the undercarriage.

Yet another object of the present invention is the provision of an undercarriage, as defined above, which undercarriage is economical to produce, efficient in operation, and decreases the strength and experience necessary in loading the gas cylinder from the floor to the upper position on the rear of a movable undercarriage for an arc welder.

These and other objects and advantages will become apparent in considering the description of the preferred embodiment of the present invention.

PREFERRED EMBODIMENT

Figure 1:
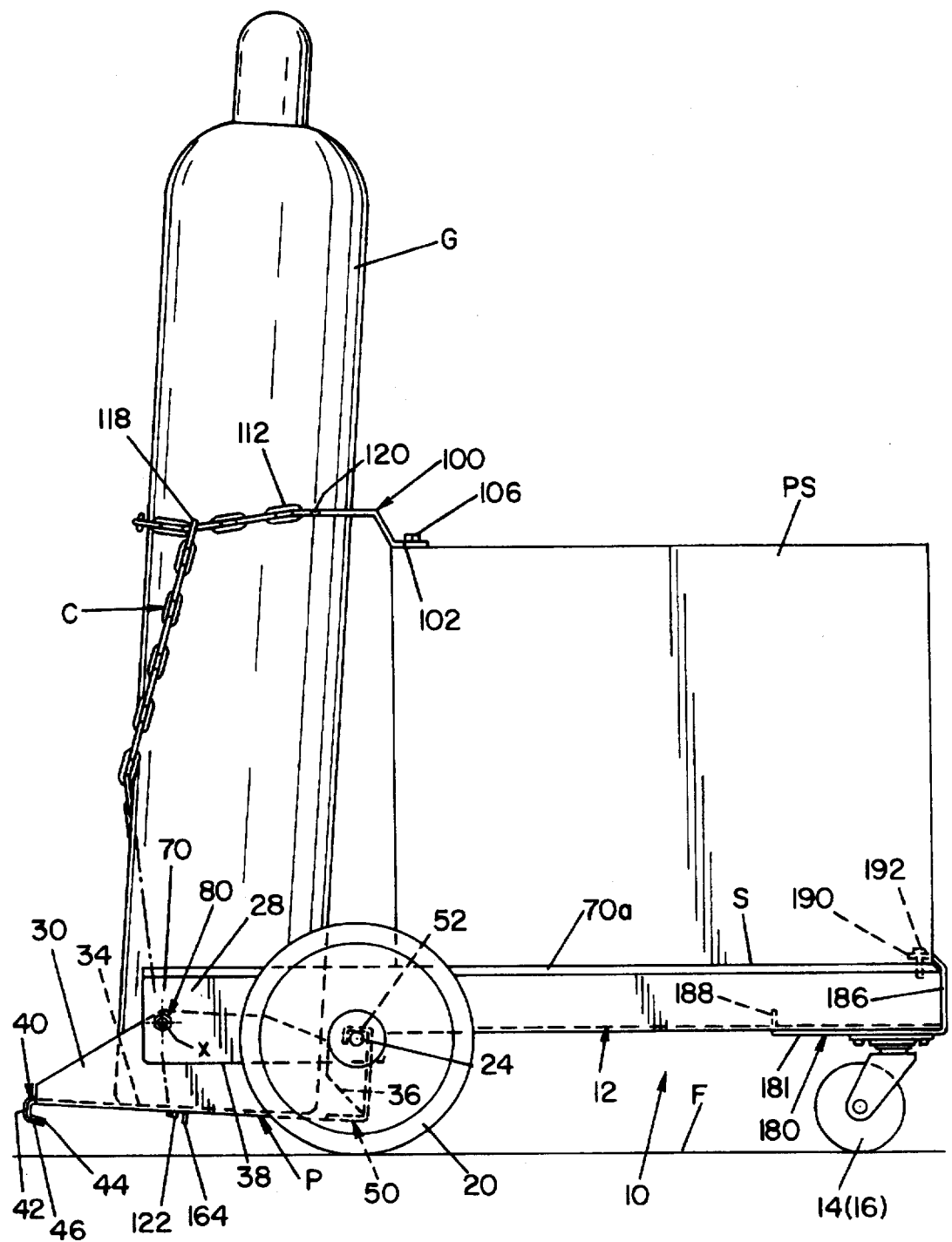
FIG. 1 is a side elevational view illustrating the preferred embodiment of the present invention with the gas cylinder in its loaded position for movement of the undercarriage around the facility.
Figure 2:
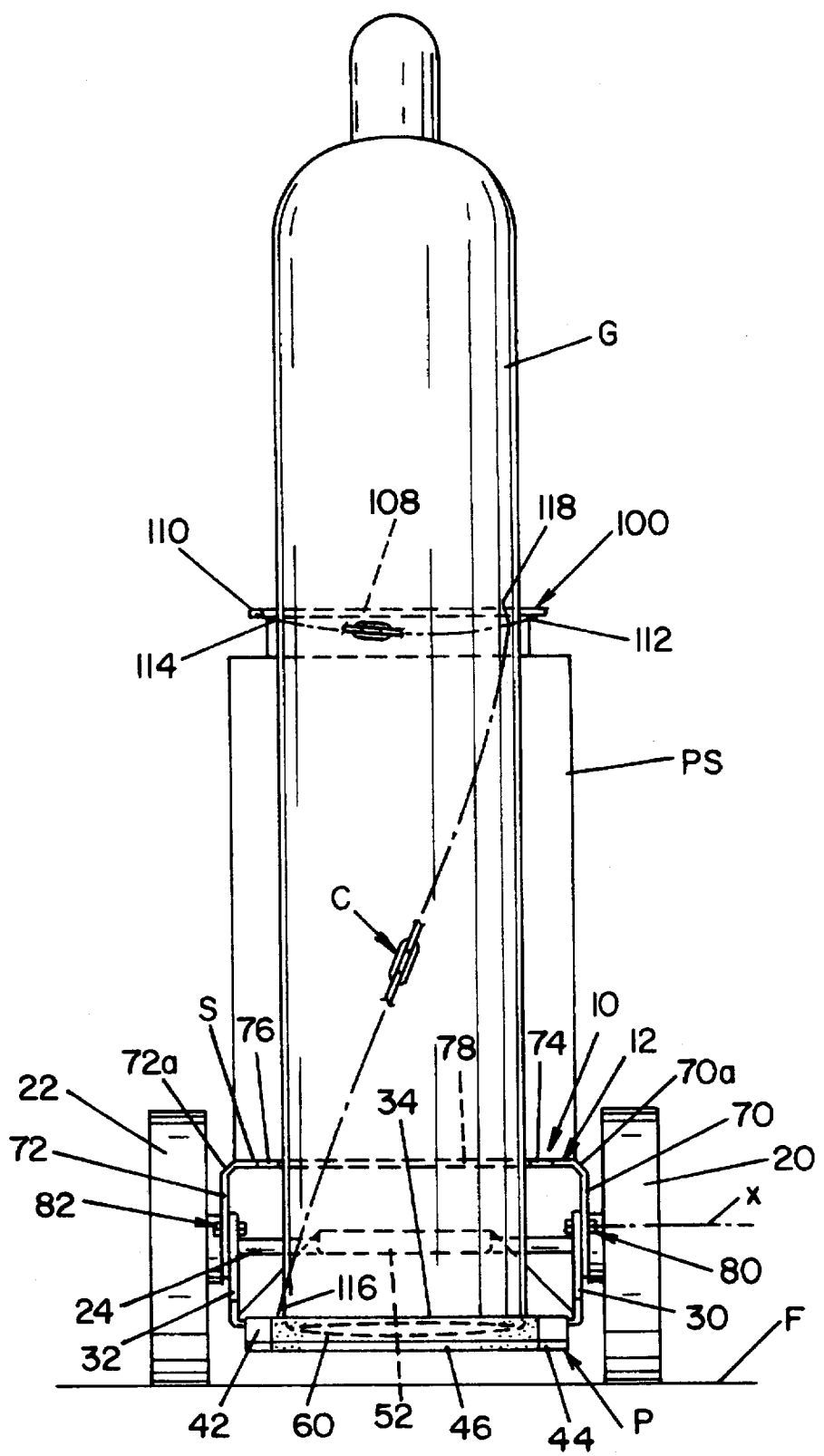
FIG. 2 is a rear elevational view of the preferred embodiment of the present invention similar to the illustration in FIG. 1.
Figure 3:
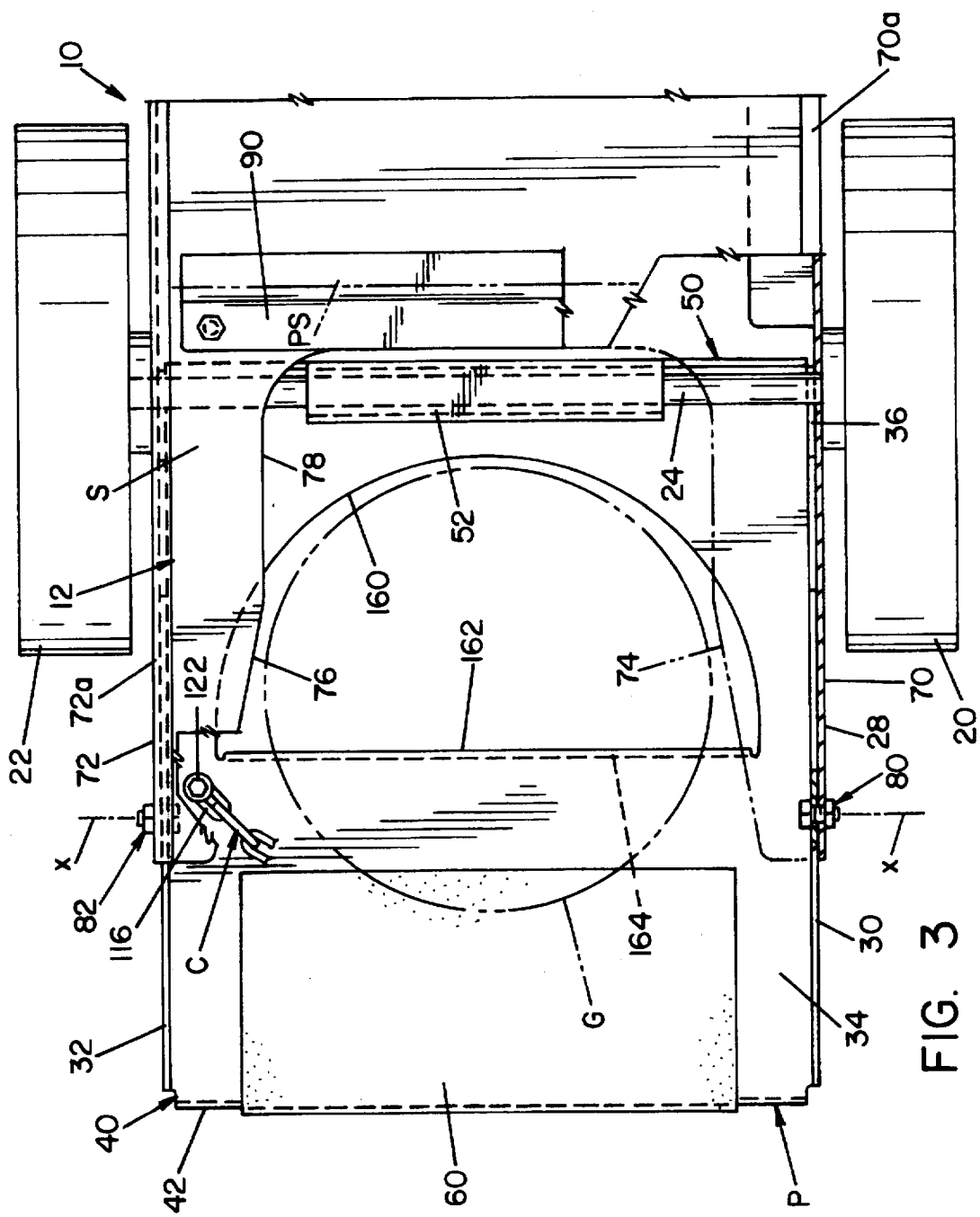
FIG. 3 is a top plan view of the rear portion of the undercarriage illustrating the top of the platform constructed in accordance with the present invention with portions of the base cut away.
Figure 4:
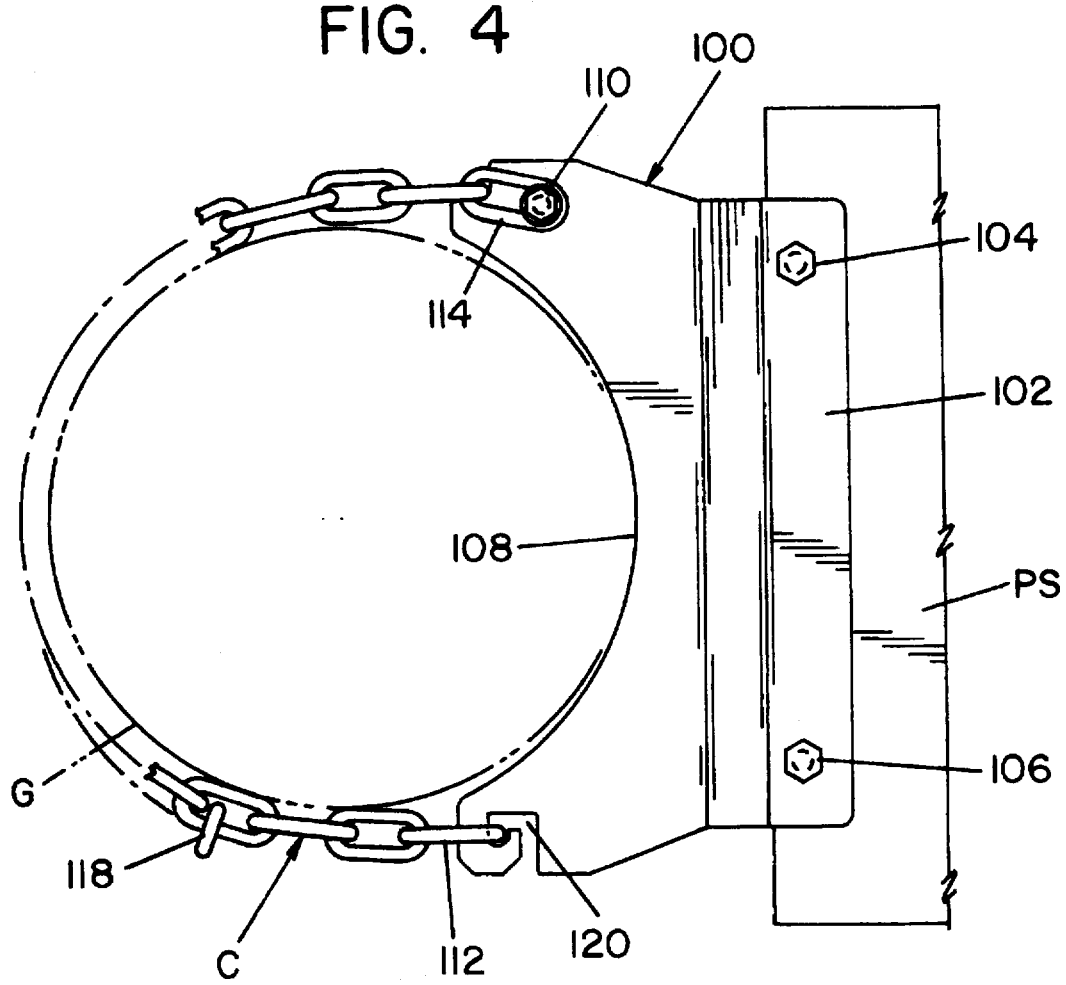
FIG. 4 is a top plan view of the upper support member for holding the gas cylinder.
Figure 5:
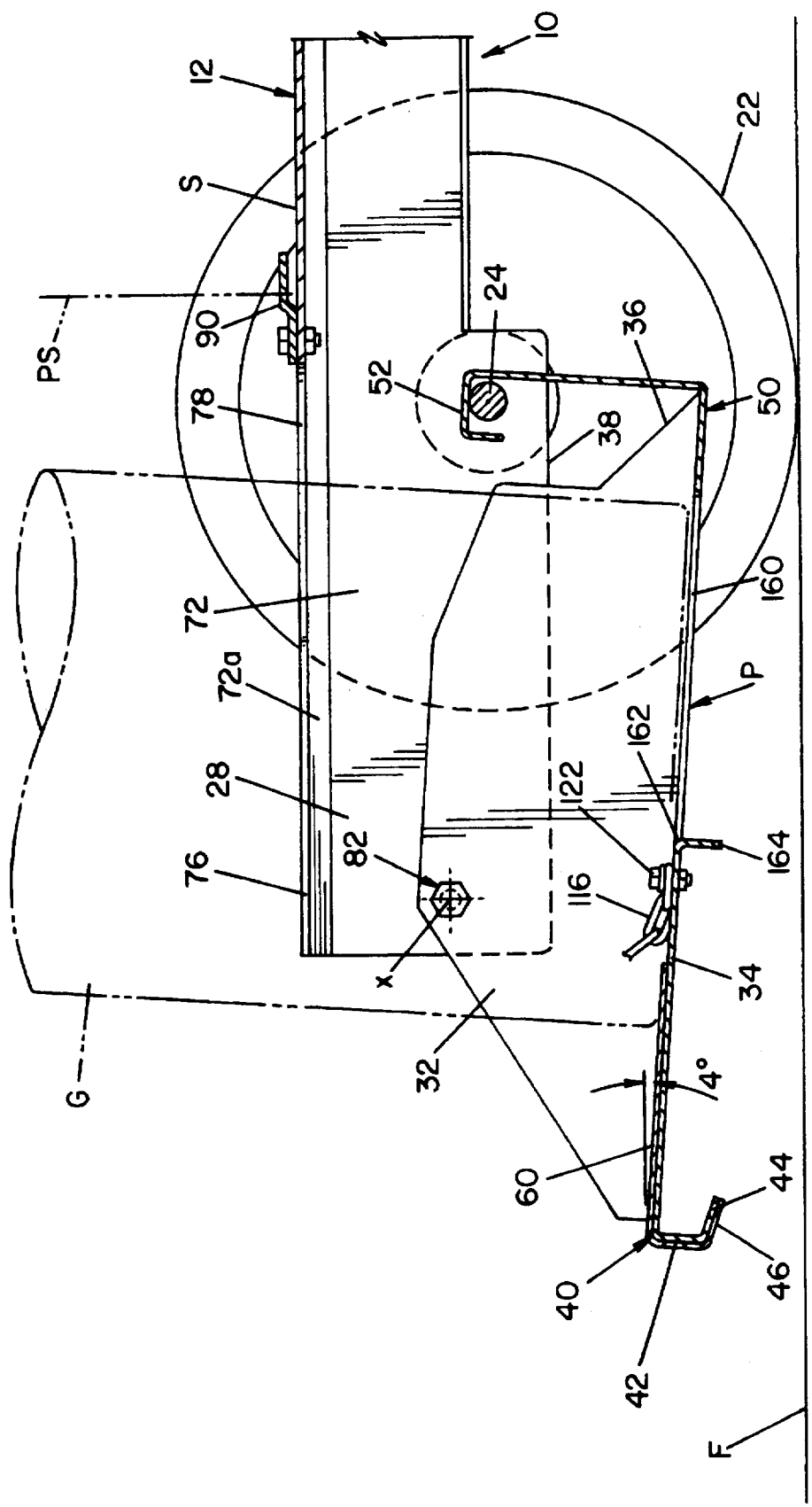
FIG. 5 is an enlarged side elevational, cross sectioned view of the novel platform constructed in accordance with the preferred embodiment of the present invention.
Figure 13:
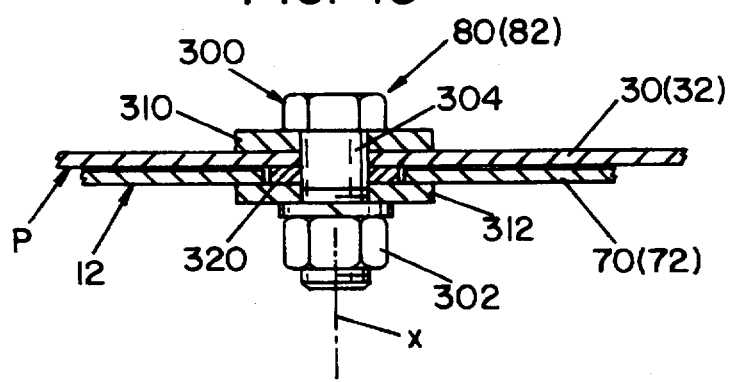
FIG. 13 is an enlarged cross sectional view of pivots 80, 82.

Referring now to the drawings wherein the showings are for the purpose of illustrating the preferred embodiment of the invention only, and not for the purpose of limiting same, FIGS. 1–9 show an undercarriage 10 adapted to transport an electric arc welder, or power supply, PS along with a rear mounted large gas cylinder G. Undercarriage 10 includes a base 12 having an upper support surface S onto which the power supply or welder PS is fixedly supported and a lower running gear arrangement consisting of front casters 14, 16, only one of which is shown, and rear support wheels 20, 22 rotatably mounted on a transversely extending axle 24 supported in holes of base 12. In accordance with the present invention, gas cylinder G is mounted on to the rear of undercarriage 10 by a novel pivoted platform P, best shown in FIG. 5 and illustrated pictorially in FIG. 11. Platform P is pivoted at the rear end 28 of base 12 about transverse axis x parallel to axle 24 of wheels 20, 22 and spaced substantially rearward of the axle, but slightly above the axle as shown in FIG. 5. Opposite sides of platform P are upstanding, spaced side walls 30, 32 between which cylinder G is maneuverable on a lower support plate 34. Rear end 40 of pivoted platform P terminates in a vertically downward projecting wall 42 generally perpendicular to support plate 34 and formed from a bent portion of the support plate, as illustrated in FIG. 5. The terminal end of the downwardly bent portion of support plate 34 is an angularly disposed, lower lip 44. The slight angle of the lip defines a downwardly facing lower engaging surface 46 having an angle selected so that when the platform is pivoted about transverse axis x, surface 46 lies flat against floor F on which the undercarriage running gear, comprising casters 14, 16 and wheels 20, 22, transports welder PS and cylinder G. Front end 50 of platform P is also bent in a manner to form a transversely extending hook 52. This hook coacts with transversely extending wheel supporting shaft 24 so that the shaft acts as an abutment member to form a stop as platform P pivots in a clockwise direction raising surface 46 from floor F as shown in FIG. 5. Angle backs 36 of side walls 30, 32 provide sissor action with edge 38 of base 12 to allow pivoting if edge 38 is deformed. Clockwise rotation of platform P is limited by engagement of hook 52 with shaft 24 so that the normal level position of support surface 34 has a backwardly inclined angle in the range of 3–6° and preferably approximately 4°, as shown in FIG. 5. For purposes to be explained later, a thin sheet of adhesively applied friction cloth 60 is secured to the rear end 40 of platform P to extend across surface 34, around wall or bumper 42 and over lower surface 46 of angled lip 44. The purpose of friction material 60 is to increase the coefficient of friction on the rear end of surface 34, as well as on the floor engaging surface 46. To pivotally support platform P pivot pins 80, 82 are located at the rear end 28 of base 12 as shown in FIG. 13. The base has downwardly bent, generally parallel, vertical support walls 70, 72, best shown in FIGS. 2 and 3, extending downwardly from the general upper flat support plate S of undercarriage 10 by angled bends 70a, 72a. Support plate S is the top wall of base 12. To allow cylinder G to be moved into the position shown in FIGS. 1 and 5 welder support surface S is provided with a rearwardly facing rectangular recess slot, best shown in FIG. 3, and including oppositely facing tapered legs 74, 76 converging into a cut away portion 78 which is generally rectangular in configuration and has a width greater than the diameter of cylinder G so that the cylinder nests between tapered legs 74, 76 and into portion 78. To mount power supply or welder PS onto support plate S of base 12, there is provided a standard welder mounting bracket 90 bolted to plate S, which bracket does not form a part of the present invention and is employed only to fix the welder at a position forward of the recessed portion 78, as shown in FIGS. 3 and 5. The mounting of the power supply onto base 12 is standard practice and does not form a novel aspect of the present invention. There is a slight spacing between the back of gas cylinder G and bracket 90 to allow a forward tilt of the cylinder into the final loaded position on platform P. To fix the gas cylinder into the final loaded position, as best shown in FIGS. 1 and 2, the somewhat standard upper support 100 is provided with a bracket portion 102 affixed by bolts 104, 106 onto the top of welder PS. Support 100 includes a contoured nest 108 for accepting cylinder G, as best shown in FIG. 4. A novel chain arrangement is used for supporting cylinder G in the tilted orientation onto the back of undercarriage 10. This novel chain arrangement includes a three piece chain C mounted on a fixed chain anchor 110 and having a free end 112 and connected ends 114, 116 joined together at intermediate joint 118. The free end 112 is looped around a chain notch 120 so that the upper portion of chain C between free end 112 and fixed end 114 essentially encircles cylinder G as it is in its final loaded resting position. A portion of the chain C extending from joint 118 wraps around the body of cylinder G onto a fixed lower anchor 122 which, in the preferred embodiment is secured to the central portion of platform P just below axis x so that its fixed position does not change drastically as platform P is pivoted about axis x.

Figure 6:
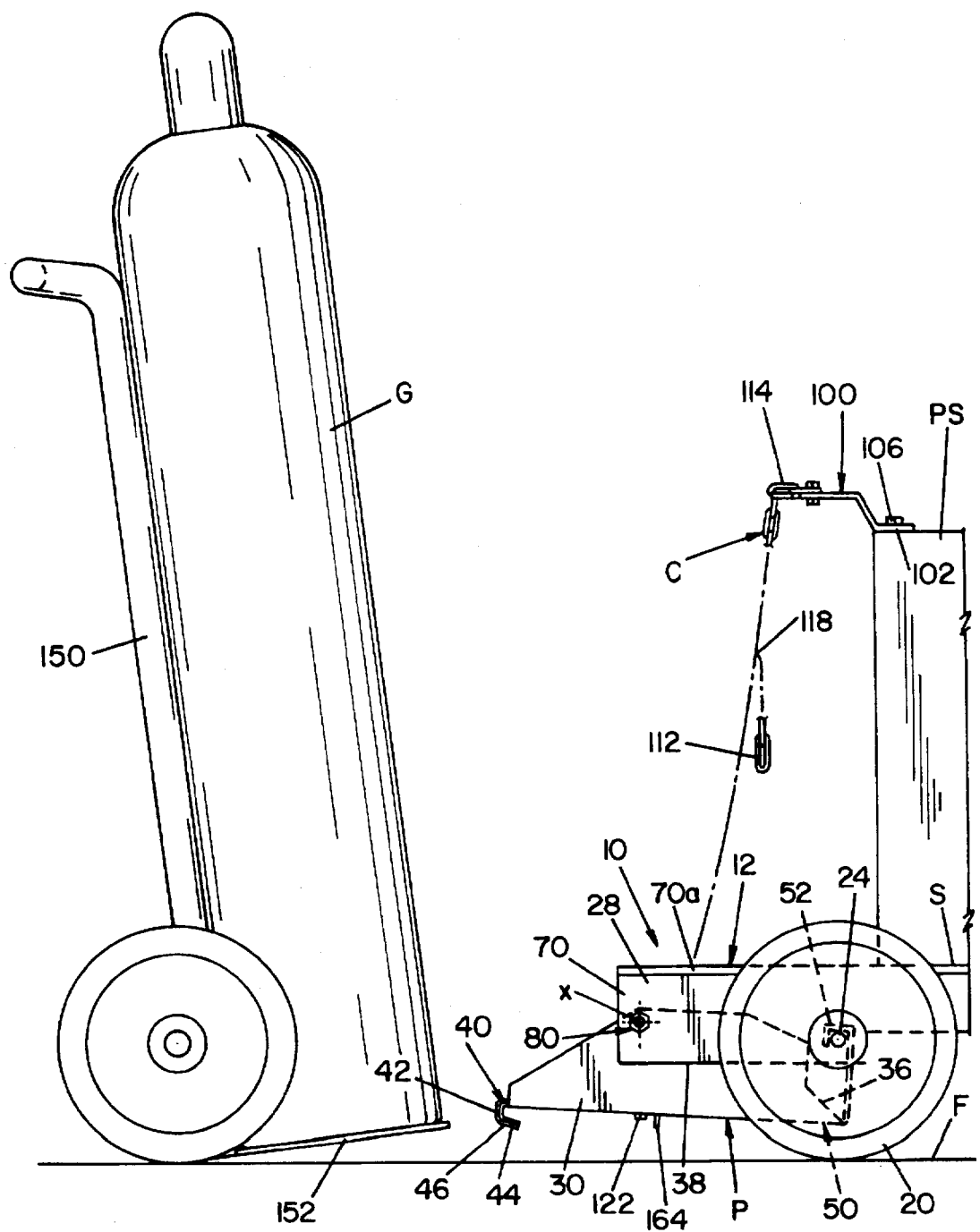
FIG. 6 is a side plan view showing the rear portion of an empty undercarriage with the gas cylinder moved into loading position.
Figure 7:
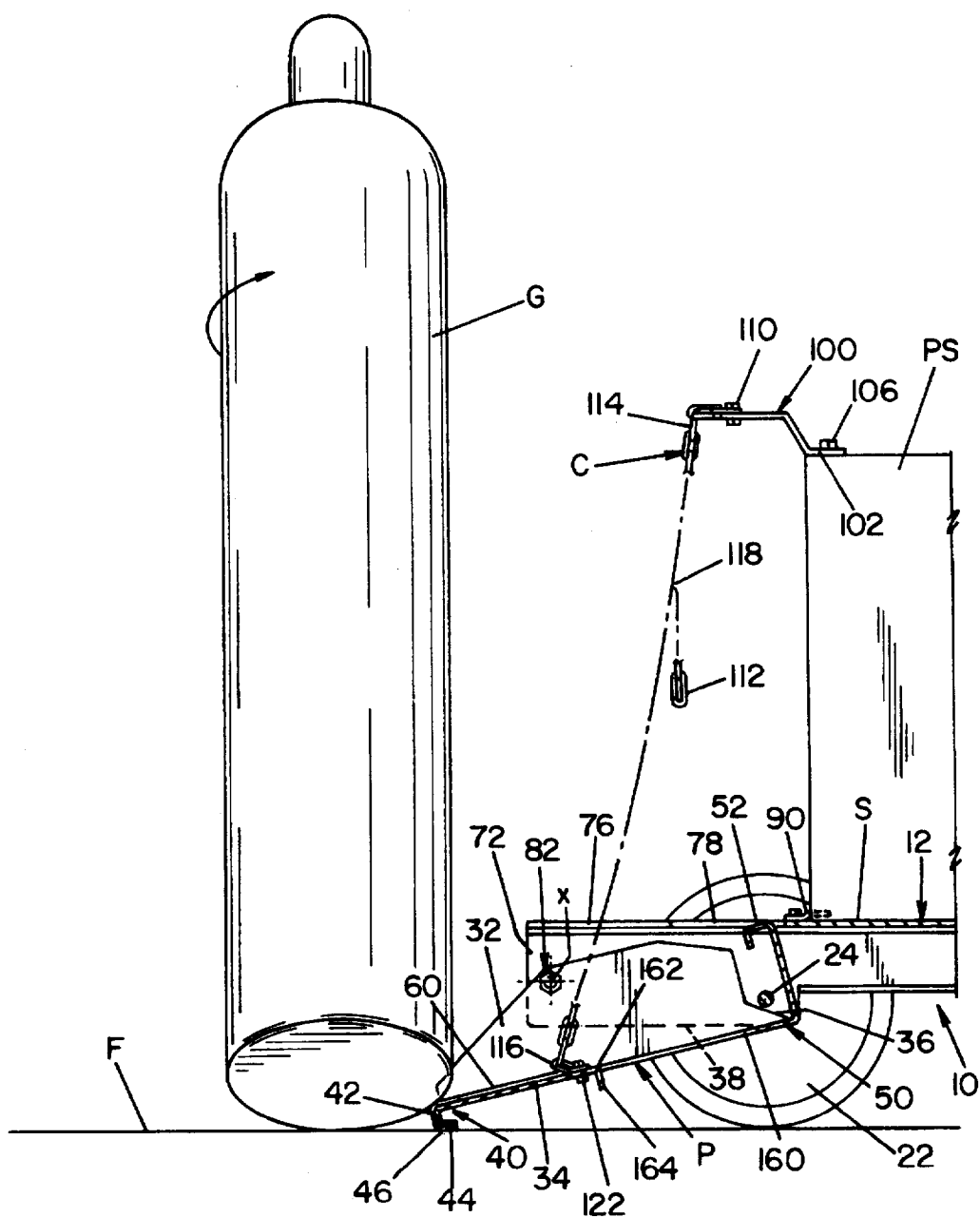
FIG. 7 is a side plan view similar to FIG. 6 with the gas cylinder being tilted and rotated onto the downwardly pivoted platform constructed in accordance with the preferred embodiment of the present invention.
Figure 8:
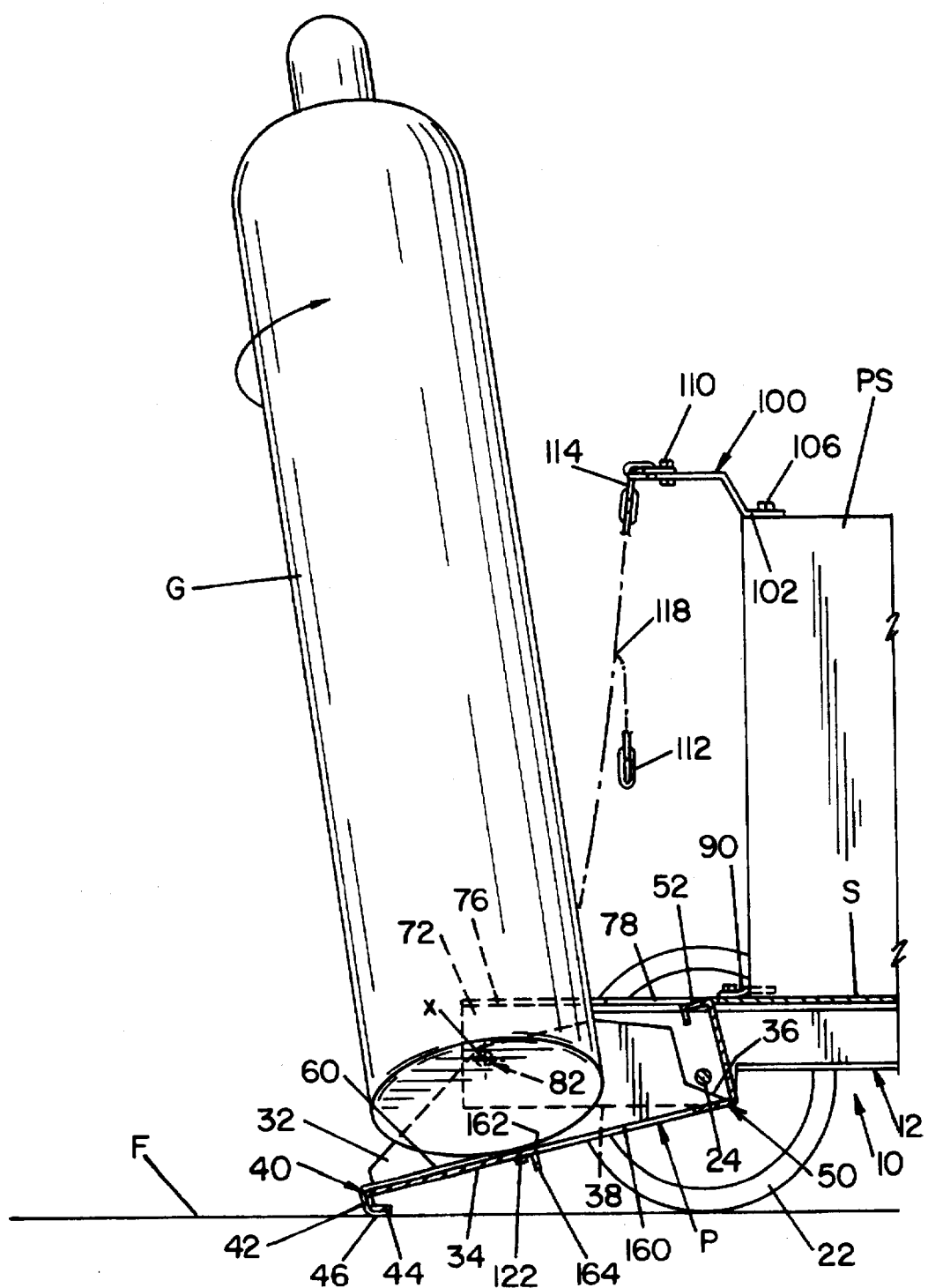
FIG. 8 is a side plan view similar to FIG. 6 showing the gas cylinder rotated up the downwardly pivoted platform constructed in accordance with the present invention.
Figure 9:
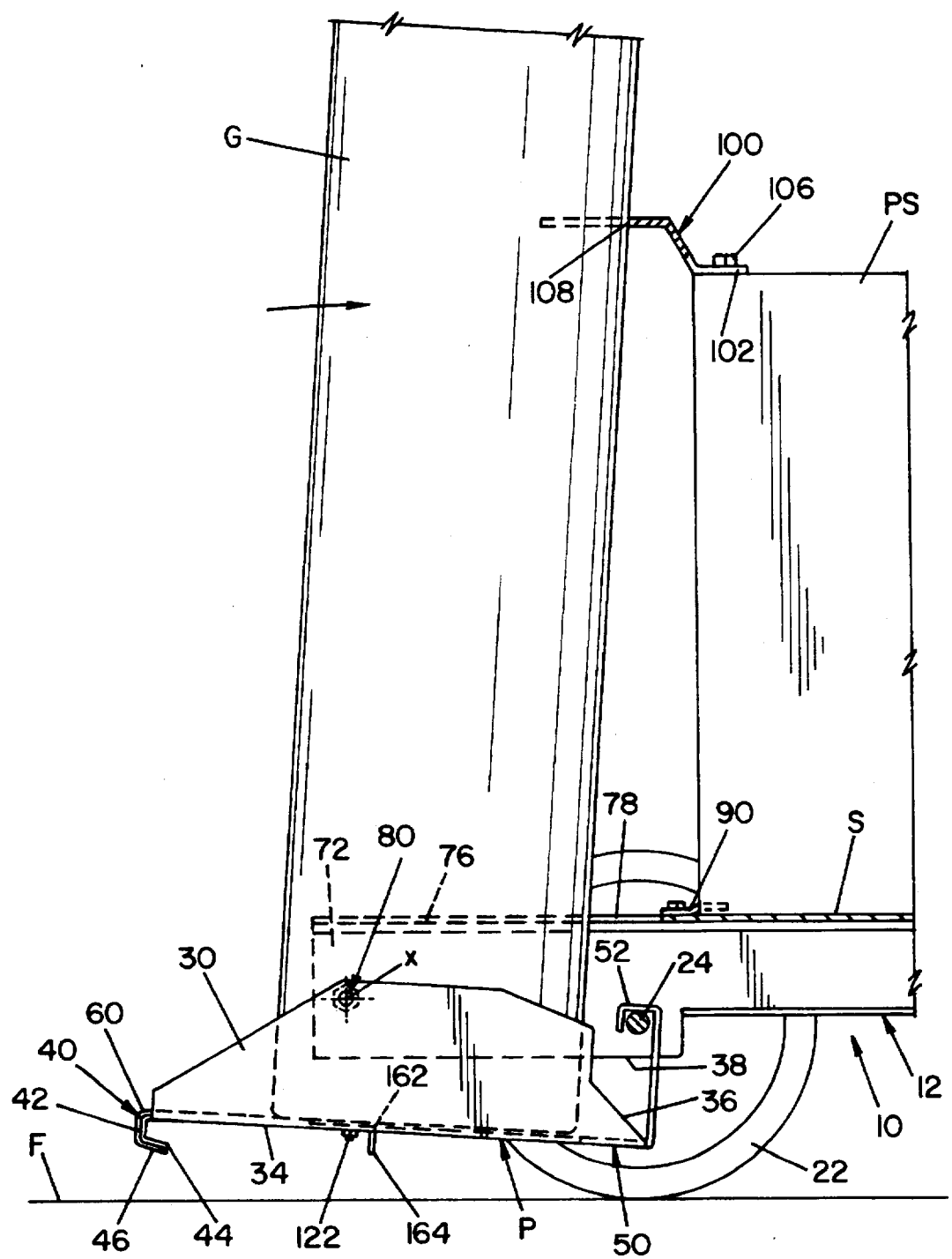
FIG. 9 is a partial side plan view similar to FIG. 6 illustrating the lower portion of the gas cylinder in its final lifted, loaded position on the pivoted platform constructed in accordance with the preferred embodiment of the present invention.

Platform P is employed for lifting and loading cylinder G onto the rear portion 28 of base 12 in a manner best illustrated in FIGS. 6–9. With the undercarriage 10 unloaded, the two wheel transport 150, having a lower fixed platform 152, moves cylinder G to a position just behind undercarriage 10. Since the center of gravity of platform P is toward the front end of the platform, between axis x and axle 24, platform P has its normal tilted forward level position, as shown in FIG. 6. Cylinder G is removed from transport 150 and tilted toward a person loading the cylinder, as illustrated in FIG. 7. Then the cylinder is rotated on the floor toward undercarriage 10 to engage rear end 40 of platform P by first contacting friction increasing material 60. Rotation of the tilted cylinder G onto the end 40 of support surface 34 forces platform P to pivot in a first direction bringing the platform into engagement with floor F, with surface 46 carrying the friction increasing material engaging the floor. The friction engaging material locks the surface 46 against floor F preventing movement of the undercarriage away from cylinder G, as the tilted cylinder is rotated up the downwardly pivoted support surface 34. This operation is shown in FIG. 7. As cylinder G is rotated between parallel legs 74, 76 toward cut away portion 78 of surface S on base 12, pivoted platform P remains downwardly with lip 44 engaging floor F in a manner to prevent forward movement of undercarriage 10, as shown in FIG. 8. As cylinder G is rotated upwardly along surface 34 it climbs the friction increasing material 60 and eventually reaches a position where its center of gravity is on the front side of axis x. When this occurs, cylinder G tilts forward and platform P pivots in a second direction or clockwise direction around transverse axis x until hook 52 engages wheel shaft 24, as illustrated in FIG. 9. At this time, pivoted platform P is in the slightly inclined position, with cylinder G engaging nest 108 of upper or top support 100. Since power supply PS is fixed on surface S of base 12, top support 100 locates the proper position of cylinder G. Thereafter, the free end 112 of chain C is wrapped around the body of cylinder G and latched into notch 120, as shown in FIG. 4. The novel pivoted platform P easily shifts cylinder G from the position on the floor to the raised position mounted on the back of undercarriage 10, where it is secured in position by chain C. Thereafter, the undercarriage, with both the power supply PS and gas cylinder G, can be moved along floor F by the running gear constituting rear wheels 20, 22 and front pivoted casters 14, 16.

Figure 10:
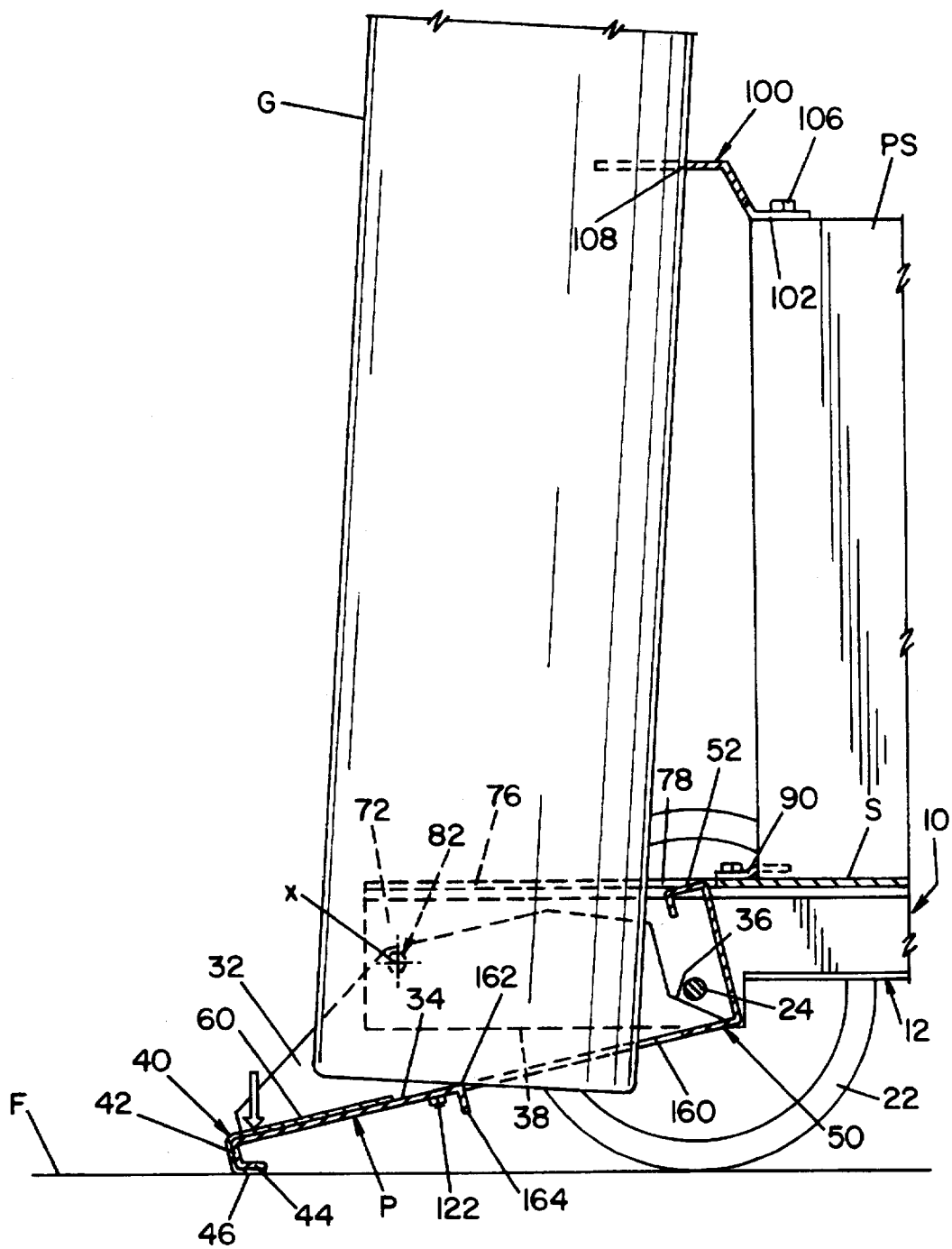
FIG. 10 is a side plan view similar to FIG. 9 wherein the platform is inadvertently pivoted downwardly without propelling the cylinder or raising the undercarriage.

With the cylinder secured in position by chain C, inadvertent downward movement, indicated by the arrow in FIG. 10, will only pivot the platform downwardly and will not raise the front of undercarriage 10. In accordance with another aspect of the present invention, platform P is provided with a recess opening 160, best illustrated in FIGS. 3, 7, 8, 10 and 11. Recess opening 160 is generally semi-circular encompassing the forward half of the circular portion of plate 34 adapted to contact the bottom end of cylinder G when the cylinder is in its final loaded position. Recess opening 160 has a generally diametrical pivot ledge 162 with a downwardly extending, transverse rib 164. Opening 160 is greater in diameter than cylinder G so that as a force is applied to platform P in the direction of the arrow in FIG. 10 and when chain C is not connected, the downward pivoting action of platform P merely allows the cylinder G to pivot into recess opening 160. Consequently, force on the rear end of surface 34 will not propel or attempt to dislodge cylinder G from its resting position on undercarriage 10 when the cylinder is not secured by the chain. If the cylinder is to be unloaded the chain will be released and cylinder G is merely tilted forward toward the rear end of platform P from the position shown in FIG. 10. Thereafter, the cylinder is pivoted toward a person unloading the cylinder and rotated down surface 34. When the center of gravity of cylinder G shifts rearward of axis x, platform P pivots downwardly against the floor, as shown in FIGS. 7 and 8. Then cylinder G is merely rotated off platform P and placed on a two wheel transport 150, as shown in FIG. 6. By providing recess opening 160, the cylinder is not dislodged merely by pivoting platform P in the counterclockwise direction. This concept is advantageous, but is not essential in the operation of the invention. The recess opening is employed in the preferred embodiment of the invention.

Figure 12:
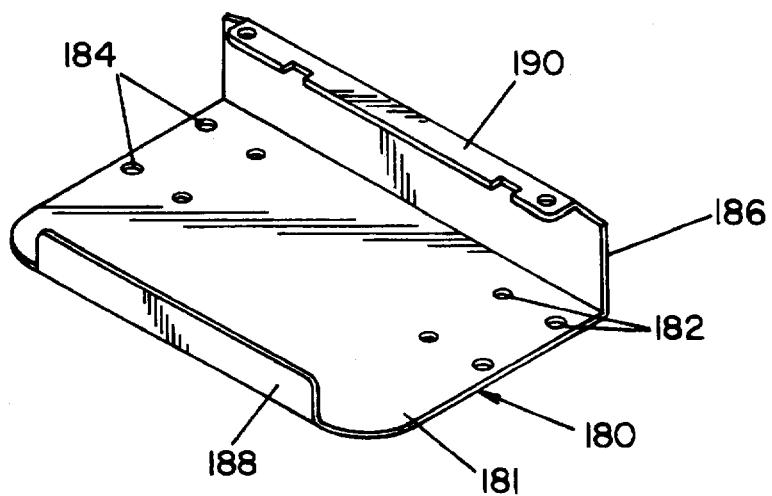
FIG. 12 is a pictorial view of the front bumper for the base of the undercarriage.

Referring now to FIGS. 1 and 12, undercarriage 10 includes a front bumper assembly 180 comprising lower generally flat plate 181 having transversely spaced caster support holes 182, 184, a front bumper wall 186 with a rear, generally parallel upstanding reinforcing rib 188. Wall 186 terminates in a rearwardly facing bracket 190 which coacts with rear bracket 90 to secure welder PS in place on the upper surface S of base 12. Bolts 192 shown in FIG. 1 hold bumper assembly 180 over the front end of base 12 and in a position for grasping the welder.

A variety of structures could provide the pivot action of platform P about pins or journals 80, 82 as shown in FIG. 13. Shank 304 of bolt 300 passes through washers 310, 312, and 320 and wall 30, or wall 32 and wall 70, or wall. Bolt 500 and nut 302 clamp washers 310, 312, and 320 to wall 30, or wall 32. Washer 320 is clamped between wall 30, or wall 32, and washer 312. Washer 320 fits in an opening in vertical support wall 70, or 72 and has a thickness greater than the support wall of base 12. This clearance allows free pivoting of platform P.

Figure 11:
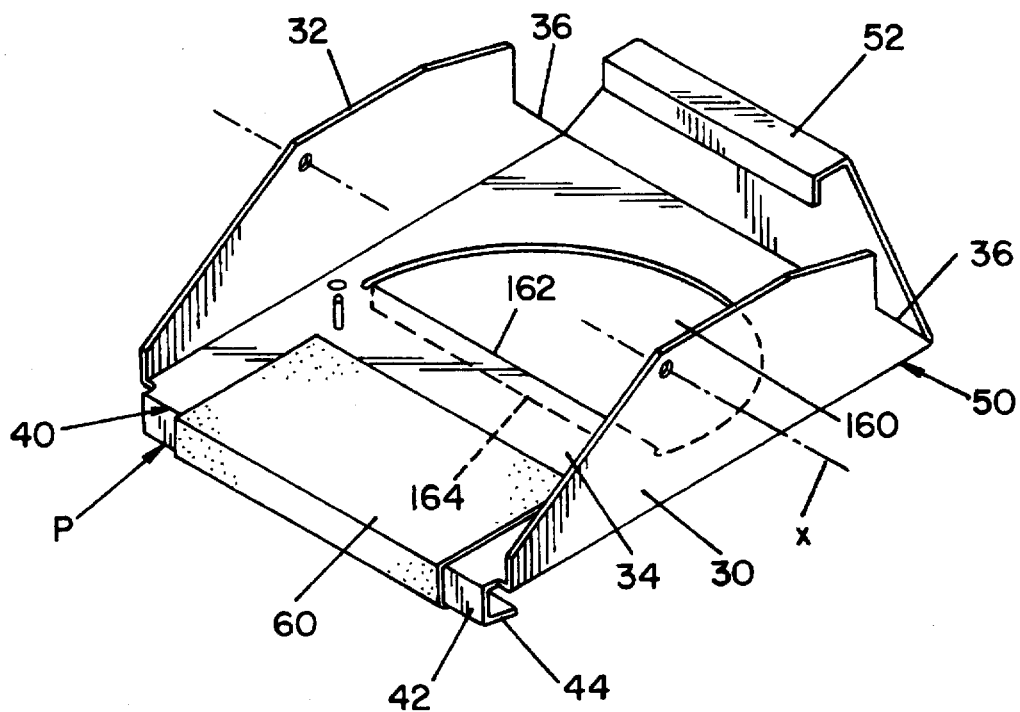
FIG. 11 is a pictorial view of the novel pivoted platform constructed in accordance with the preferred embodiment of the present invention.
Figure 14:
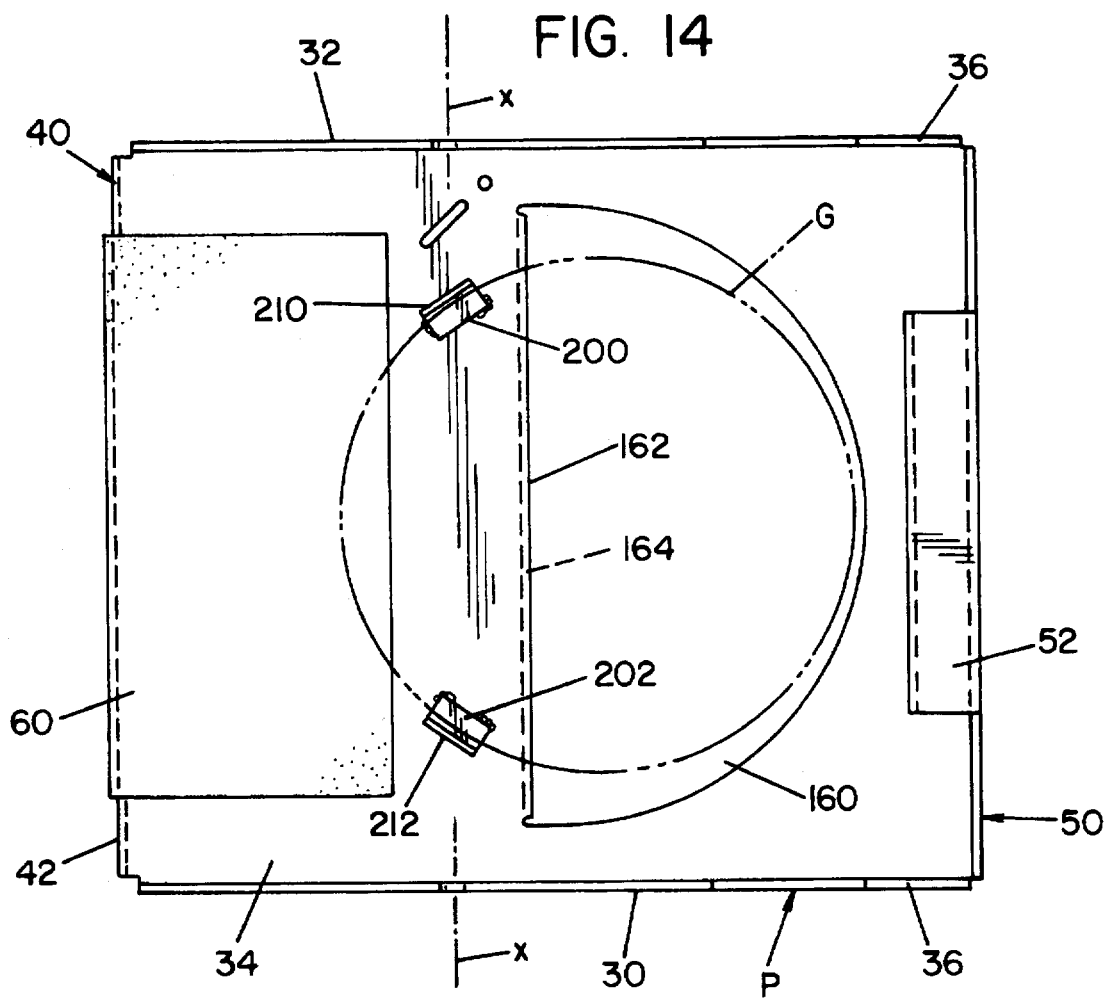
FIG. 14 is a top plan view of a modification of the preferred embodiment of the present invention wherein the novel pivoted platform is provided with angled tabs to locate the cylinder in its final loaded position.

A modification of the preferred embodiment is illustrated in FIG. 14, wherein pivoted platform P is provided with transversely spaced L-shaped tabs 200, 202 welded on surface 34 and having upstanding portions 210, 212, respectively. By using these L-shaped tabs, cylinder G can be rotated into the proper position and rest against top support 100 without use of chain C. This illustrated embodiment is not preferred. The novel chain arrangement is employed in practicing the invention. Various modifications may be made in surface 34 to increase the coefficient of friction which is done by adhesive sheet 60 in the preferred embodiment. The rear portion 40 of surface 34 could be machined in a manner to allow increased friction with the lower surface of cylinder G as the cylinder is being rotated up surface 34 of the downwardly pivoted, platform P. In addition, a different friction increasing coating could be used on surface 46 and on the rear portion 40 of surface 34. There is no requirement for a friction increasing coating to be on bumper 42; however, the mere wrapping of sheet 60 around end 40 of platform P, as shown in FIG. 11, has been found to be effective.

Having thus defined the invention, the following is claimed:

1. A platform for use in loading and supporting a gas cylinder onto a movable welder undercarriage of the type having a base with floor engaging wheels, said base supporting a welder and having a rear portion for carrying a gas cylinder in a position spaced from the floor, said platform comprising: a lower cylinder support plate with a rear end and a front end; means for mounting said platform on the rear portion of said base to pivot about a traverse axis located between the said rear end and the said front end in a first pivot direction to a cylinder loading position with said rear end of said plate tilted downward against said floor and in a second pivot direction to a cylinder supporting position where the center of gravity of said cylinder is on the side of said axis toward said front end of said support plate; and, stop means for preventing rotation of said platform with respect to said base about said axis in said second pivot direction beyond said cylinder supporting position of said plate of said platform.

2. A platform as defined in claim 1 wherein said cylinder supporting position of said plate is a position where said plate is tilting toward said welder at an acute angle to the horizontal.

3. A platform as defined in claim 2 wherein said angle is less than 10°.

4. A platform as defined in claim 2 wherein said angle is in the range of 3°–6°.

5. A platform as defined in claim 2 wherein said support plate has a floor engaging bumper with a lower lip with a downwardly facing flat surface to engage said floor when said platform is tilted into the cylinder loading position.

6. A platform as defined in claim 1 wherein said stop means includes an abutment member on said base and a stop portion of said platform above said member and movable against said member as said platform pivots in said second direction.

7. A platform as defined in claim 1 wherein said support plate has a floor engaging bumper with a lower lip with a downwardly facing flat surface to engage said floor when said platform is tilted into the cylinder loading position.

8. A platform as defined in claim 1 wherein said cylinder support plate includes a large flat surface with a generally circular portion defining the portion engaging the cylindrical end of said cylinder and a recess opening in said support plate removing the front most half of said circular portion to define a transversely extending pivot ledge whereby said cylinder will pivot into said recess if said platform is inadvertently pivoted in said first direction with a cylinder on said support plate.

9. A platform for use in loading and supporting a gas cylinder onto a movable welder undercarriage of the type having a base with floor engaging wheels, said base supporting a welder and having a rear portion for carrying a gas cylinder in a position spaced from the floor, said platform comprising: a lower cylinder support plate with a rear end and a front end; means for mounting said platform on the rear portion of said base to pivot about a traverse axis in a first pivot direction to a cylinder loading position with said rear end of said plate tilted downward against said floor and in a second pivot direction to a cylinder supporting position where the center of gravity of said cylinder is on the side of said axis toward said front end of said support plate; stop means for preventing rotation of said platform with respect to said base about said axis in said second pivot direction beyond said cylinder support position of said plate of said platform; and, first and second upwardly extending side walls on opposite transverse sides of said support plate and said base including two, transversely spaced generally vertical support walls matching said side walls of said platform, said mounting means of said platform including a pivot pin on said axis between each of said side walls and its matching support walls whereby said platform pivots on said pins.

10. A platform as defined in claim 9 wherein said stop means includes an abutment member of said base and a stop portion of said platform above said member and movable against said member as said platform pivots in said second direction.

11. A platform as defined in claim 10 wherein said base includes a set of rear wheels rotatably mounted on a transverse axle at the rear of said base and said abutment member is said axle.

12. A platform as defined in claim 11 wherein said stop portion of said platform is a hook protruding upwardly from the front end of said platform and extending transversely above said axle on said base.

13. A platform as defined in claim 10 wherein said support plate has a floor engaging bumper with a lower lip with a downwardly facing flat surface to engage said floor when said platform is tilted into the cylinder loading position.

14. A platform as defined in claim 13 wherein said bumper includes a transversely extending generally vertical wall extending between the lower lip and the large flat surface of said support plate.

15. A platform as defined in claim 14 including a coating of friction material on, said flat floor engaging surface of said lip.

16. A platform as defined in claim 9 including means for increasing the coefficient of friction of said support plate at the rear end of said support plate.

17. A platform as defined in claim 9 wherein said support plate has a floor engaging bumper with a lower lip with a downwardly facing flat surface to engage said floor when said platform is tilted into the cylinder loading position.

18. A platform as defined in claim 17 including a coating of friction material on said flat floor engaging surface of said lip.

19. A platform as defined in claim 18 wherein said coating is a sheet of friction material adhered to said flat floor engaging surface of said lip.

20. A platform for use in loading and supporting a gas cylinder onto a movable welder undercarriage of the type having a base with floor engaging wheels, said base supporting a welder and having a rear portion for carrying a gas cylinder in a position spaced from the floor, said platform comprising: a lower cylinder support plate with a rear end a front end; means for mounting said platform on the rear portion of said base to pivot about a traverse axis in a first pivot direction to a cylinder loading position with said rear end of said plate tilted downward against said floor and in a second pivot direction to a cylinder supporting position where the center of gravity of said cylinder is on the side of said axis toward said front end of said support plate; stop means for preventing rotation of said platform with respect to said base about said axis in said second pivot direction beyond said cylinder support position of said plate of said platform, said stop means including an abutment member on said base and a stop portion of said platform above said member and movable against said member as said platform pivots in said second direction, said base including a set of rear wheels rotatably mounted on a transverse axle at the rear of said base and said abutment member being said axle.

21. A platform as defined in claim 20 wherein said stop portion of said platform is a hook protruding upwardly from the front end of said platform and extending transversely above said axle on said base.

22. A platform for use in loading and supporting a gas cylinder onto a movable welder undercarriage of the type having a base with floor engaging wheels, said base supporting a welder and having a rear portion for carrying a gas cylinder in a position spaced from the floor, said platform comprising: a lower cylinder support plate with a rear end and a front end; means for mounting said platform on the rear portion of said base to pivot about a traverse axis in a first pivot direction to a cylinder loading position with said rear end of said plate tilted downward against said floor and in a second pivot direction to a cylinder supporting position where the center of gravity of said cylinder is on the side of said axis toward said front end of said support plate; stop means for preventing rotation of said platform with respect to said base about said axis in said second pivot direction beyond said cylinder support position of said plate of said platform; and, means for increasing the coefficient of friction of said support plate at the rear end of said support plate.

23. A platform for use in loading and supporting a gas cylinder onto a movable welder undercarriage of the type having a base with floor engaging wheels, said base supporting a welder and having a rear portion for carrying a gas cylinder in a position spaced from the floor, said platform comprising: a lower cylinder support plate with a rear end and a front end; means for mounting said platform on the rear portion of said base to pivot about a traverse axis in a first pivot direction to a cylinder loading position with said rear end of said plate tilted downward against said floor and in a second pivot direction to a cylinder supporting position where the center of gravity of said cylinder is on the side of said axis toward said front end of said support plate; stop means for preventing rotation of said platform with respect to said base about said axis in said second pivot direction beyond said cylinder support position of said plate of said platform, wherein said cylinder supporting position of said plate is a position where said plate is tilting toward said welder at an angle; and, means for increasing the coefficient of friction of said support plate at the rear end of said support plate.

24. A platform for use in loading and supporting a gas cylinder onto a movable welder undercarriage of the type having a base with floor engaging wheels, said base supporting a welder and having a rear portion for carrying a gas cylinder in a position spaced from the floor, said platform comprising: a lower cylinder support plate with a rear end and a front end; means for mounting said platform on the rear portion of said base to pivot about a traverse axis in a first pivot direction to a cylinder loading position with said rear end of said plate tilted downward against said floor and in a second pivot direction to a cylinder supporting position where the center of gravity of said cylinder is on the side of said axis toward said front end of said support plate; stop means for preventing rotation of said platform with respect to said base about said axis in said second pivot direction beyond said cylinder support position of said plate of said platform, said stop means including an abutment member on said base and a stop portion of said platform above said member and movable against said member as said platform pivots in said second direction; and, means for increasing the coefficient of friction of said support plate at the rear end of said support plate.

25. A platform for use in loading and supporting a gas cylinder onto a movable welder undercarriage of the type having a base with floor engaging wheels, said base supporting a welder and having a rear portion for carrying a gas cylinder in a position spaced from the floor, said platform comprising: a lower cylinder support plate with a rear end and a front end; means for mounting said platform on the rear portion of said base to pivot about a traverse axis in a first pivot direction to a cylinder loading position with said rear end of said plate tilted downward against said floor and in a second pivot direction to a cylinder supporting position where the center of gravity of said cylinder is on the side of said axis toward said front end of said support plate; and, stop means for preventing rotation of said platform with respect to said base about said axis in said second pivot direction beyond said cylinder support position of said plate of said platform, said support plate having a floor engaging bumper with a lower lip with a downwardly facing flat surface to engage said floor when said platform is tilted into the cylinder loading position, said bumper including a transversely extending generally vertical wall extending between the lower lip and the large flat surface of said support plate.

26. A platform as defined in claim 25 including a coating of friction material on said flat floor engaging surface of said lip.

27. A platform as defined in claim 26 wherein said coating is a sheet of friction material adhered to said flat floor engaging surface of said lip.

28. A platform for use in loading and supporting a gas cylinder onto a movable welder undercarriage of the type having a base with floor engaging wheels, said base supporting a welder and having a rear portion for carrying a gas cylinder in a position spaced from the floor, said platform comprising: a lower cylinder support plate with a rear end and a front end; means for mounting said platform on the rear portion of said base to pivot about a traverse axis in a first pivot direction to a cylinder loading position with said rear end of said plate tilted downward against said floor and in a second pivot direction to a cylinder supporting position where the center of gravity of said cylinder is on the side of said axis toward said front end of said support plate; and, stop means for preventing rotation of said platform with respect to said base about said axis in said second pivot direction beyond said cylinder support position of said plate of said platform, said cylinder supporting position of said plate being a position where said plate is tilting toward said welder at an angle, said support plate having a floor engaging bumper with a lower lip with a downwardly facing flat surface to engage said floor when said platform is tilted into the cylinder loading position, said bumper including a transversely extending generally vertical wall extending between the lower lip and the large flat surface of said support plate.

29. A platform for use in loading and supporting a gas cylinder onto a movable welder undercarriage of the type having a base with floor engaging wheels, said base supporting a welder and having a rear portion for carrying a gas cylinder in a position spaced from the floor, said platform comprising: a lower cylinder support plate with a rear end and a front end; means for mounting said platform on the rear portion of said base to pivot about a traverse axis in a first pivot direction to a cylinder loading position with said rear end of said plate tilted downward against said floor and in a second pivot direction to a cylinder supporting position where the center of gravity of said cylinder is on the side of said axis toward said front end of said support plate; stop means for preventing rotation of said platform with respect to said base about said axis in said second pivot direction beyond said cylinder support position of said plate of said platform, said cylinder supporting position of said plate being a position where said plate is tilting toward said welder at an angle, said support plate having a floor engaging bumper with a lower lip with a downwardly facing flat surface to engage said floor when said platform is tilted into the cylinder loading position; and, a coating of friction material on said flat floor engaging surface of said lip.

30. A platform as defined in claim 29 wherein said coating is a sheet of friction material adhered to said flat floor engaging surface of said lip.

31. An undercarriage for a welding power supply including a base for supporting a power supply, said base having a running gear and a rear portion for supporting a gas cylinder and a platform for loading said gas cylinder from the floor onto said undercarriage, said platform with a rear end, a front end, and means on said base for pivoting said platform about a transverse axis between a first position tilted downwardly with said rear end of said platform against the floor to load said cylinder and a second position tilted upwardly with said rear end raised from said floor to position and support said cylinder on said base, said transverse axis being located between the said rear end and the said front end of said platform for the center of gravity of said cylinder in the said second position to be on the side of said axis away from said rear end of said platform.

32. An undercarriage as defined in claim 31 wherein said platform his a floor engaging bumper with a lower lip with a downwardly facing flat surface to engage said floor when said platform is tilted into the cylinder loading position.

33. An undercarriage as defined in claim 31 wherein said platform includes a large flat surface with a generally circular portion defining the portion engaging the cylindrical end of said cylinder and a recess opening in said flat surface removing the front most half of said circular portion to define a transversely extending pivot ledge whereby said cylinder will pivot into said recess if said platform is inadvertently pivoted toward said first position with a cylinder on said plateform.

34. An undercarriage as defined in claim 31 wherein said platform in said second position is tilting toward said welder at an acute angle to the horizontal.

35. An undercarriage as defined in claim 34 wherein said small angle is less than 10°.

36. An undercarriage as defined in claim 34 wherein said angle is in the range of 3°–6°.

37. An undercarriage as defined in claim 31 wherein said platform includes first and second upwardly extending side walls on opposite transverse sides of the said platform and said base including two, transversely spaced generally vertical support walls matching said side walls of said platform and wherein said pivoting means of said platform includes a pivot pin on said axis between each of said side walls and its matching support walls whereby said platform pivots on said pins.

38. An undercarriage as defined in claim 37 including means for stopping tilting of said platform upwardly, said stop means includes an abutment member on said base and a stop portion of said platform above said member and movable against said member as said platform pivots in said upward direction away from said floor.

39. An undercarriage for a welding power supply including a base for supporting a power supply, said base having a running gear and a rear portion for supporting a gas cylinder and a platform for loading said gas cylinder from the floor onto said undercarriage, said platform with a rear end, a front end, and means on said base for pivoting said platform about a transverse axis between a first position tilted downwardly with said rear end of said platform against the floor to load said cylinder and a second position tilted upwardly with said rear end raised from said floor to position and support said cylinder on said base, said transverse axis being located between the said rear end and the said front end of said platform, where the center of gravity of said cylinder is on the side of said axis away from said rear end of said platform in said second position, said platform having a floor engaging bumper with a lower lip with a downwardly facing flat surface to engage said floor when said platform is tilted into the cylinder loading position, said bumper including a transversely extending generally vertical wall extending between the lower lip and the large flat surface of said platform.

40. An undercarriage as defined in claim 39 including a coating of friction material on said flat floor engaging surface of said lip.

41. An undercarriage as defined in claim 40 wherein said coating is a sheet of friction material adhered to said flat floor engaging surface of said lip.

42. An undercarriage for a welding power supply including a base for supporting a power supply, said base having a running gear and a rear portion for supporting a gas cylinder and a platform for loading said gas cylinder from the floor onto said undercarriage, said platform with a rear end, a front end, and means on said base for pivoting said platform about a transverse axis between a first position tilted downwardly with said rear end of said platform against the floor to load said cylinder and a second position tilted upwardly with said rear end raised from said floor to position and support said cylinder on said base, said transverse axis being located between the said rear end and the said front end of said platform, where the center of gravity of said cylinder is on the side of said axis away from said rear end of said platform in said second position, including means for stopping tilting of said platform upwardly, said stop means including an abutment member on said base and a stop portion of said platform above said member and movable against said member as said platform pivots in said upward direction away from said floor, said base including a set of rear wheels rotatably mounted on a transverse axle at the rear of said base and said abutment member is said axle.

43. An undercarriage as defined in claim 42 wherein said stop portion of said platform is a hook protruding upwardly and extending transversely above said axle on said base.

* * * * *